May 8, 1923.
M. O. ANTHONY
ROTARY VALVE FOR INTERNAL COMBUSTION ENGINES
Filed March 7, 1921
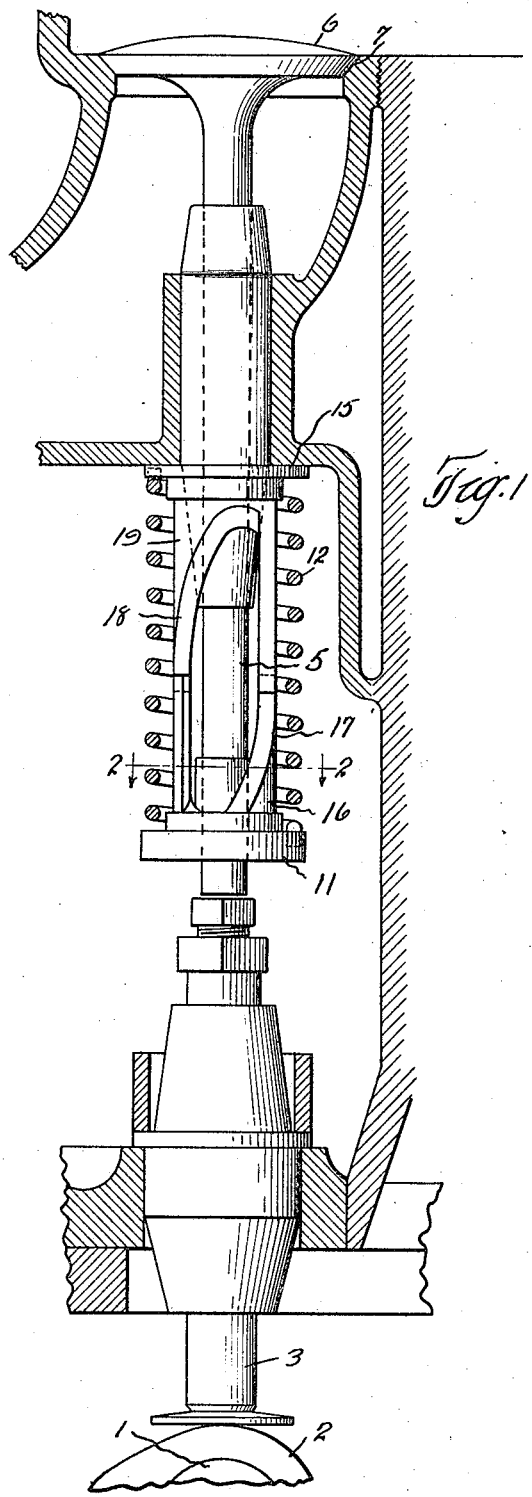
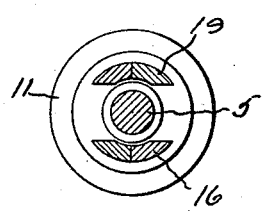
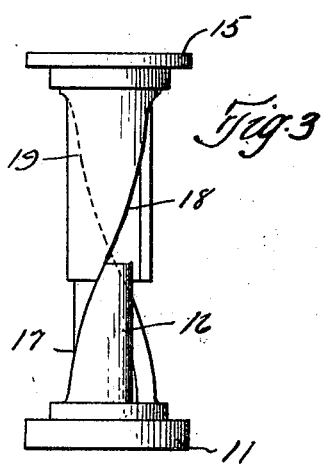
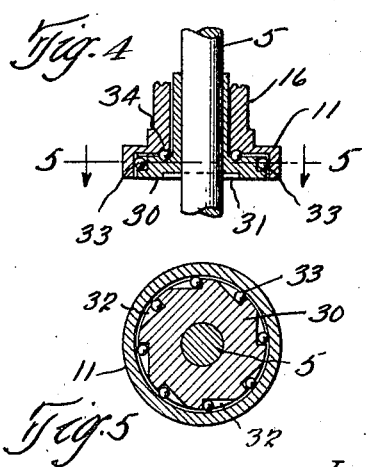

Patented May 8, 1923.

1,454,423

UNITED STATES PATENT OFFICE.

MARCUS O. ANTHONY, OF NEW YORK, N. Y., ASSIGNOR TO CONTINENTAL ENGINEERING CORPORATION, OF OMAHA, NEBRASKA, A CORPORATION OF NEBRASKA.

ROTARY VALVE FOR INTERNAL-COMBUSTION ENGINES.

Application filed March 7, 1921. Serial No. 450,420.

*To all whom it may concern:*

Be it known that I, MARCUS O. ANTHONY, a citizen of the United States, residing at New York city, in the county of New York and State of New York, have invented certain new and useful Improvements in Rotary Valves for Internal-Combustion Engines, of which the following is a specification.

This invention relates to valves of the poppet type particularly adapted for internal combustion engines and is an improvement on the valve mechanism as shown and described in my pending application, S. N. 412759, filed September 25, 1920. The valve disclosed in said application includes means mounted on the valve stem for producing a partial rotation of the valve at each lift thereof, whereby the valve is continually rotating during the operation of the engine and the valve seat is practically self-cleaning.

The present invention is illustrated in the accompanying drawings in which Fig. 1 is a sectional elevation of the mechanism. Fig. 2 is a section on the line 2—2 of Fig. 1. Fig. 3 is a detail in elevation of the cam members. Fig. 4 is a detail in vertical section of the lower cam member. Fig. 5 is a section on the line 5—5 of Fig. 4.

The means to produce the turn of the valve are fully described in said application, but will be briefly described as follows: 1 indicates a cam shaft and 2 is a cam thereon which operates a push rod 3 which works in a bushing supported in the casing of the motor. 5 is a valve stem which is operated by the push rod, 6 is the valve and 7 the valve seat. Mounted on the valve stem is a sleeve or cam member 16 having two opposite prongs with cam faces 17 which are in contact with similar faces 18 on a sleeve 19. A spring 12 is coiled between the sleeve members, the upper end of the spring being attached to a flange 15 and the lower end of the spring being attached to a flange 11, and as described in said application, as the valve lifts the contact of the faces 17 and 18 causes a turn of the valve stem a few degrees.

In the present invention, instead of the member 11 being pinned directly to the valve stem, as in the former case, I provide a clutch thimble 30 which is pinned to the valve stem by a pin 31, and the flange of this thimble has a series of inclined notches 32 containing balls 33 which form a one-way clutch with the adjacent arm or flange of the member 11, and said member is rotatably mounted on the thimble by means of ball bearings 34 so that it may be easily turned, the clutch permitting turn in one direction but preventing the reverse turn.

In operation, when the valve stem is lifted, it carries with it the thimble 30 and the lower cam member 16 which is integral with the outer clutch member 11. The contact of the faces 17 against the faces 18 turns the sleeve 16 and the clutch picks up the thimble 30 and turns said thimble, which thereby also turns the valve stem 5 and rotates the valve, against the tension of the spring 12. As the valve seats, the tension of the spring 12 rotates the member 16 in reverse direction, without, however, rotating the valve stem 5, since the clutch releases or slips on the back turn. The operation is repeated at each reciprocation of the valve, which is turned a few degrees in one direction at each lift and consequently is given a slight turning action at the beginning of its lift which has the effect of scouring or cleaning the seat, being in effect self-cleaning while the valve is in operation.

I claim:

In an internal combustion engine, the combination with a poppet valve, of a fixed thimble carried by the stem thereof near its free end and spaced from the valve guide, a pair of spaced washers surrounding the valve stem, one adjacent said thimble and the other adjacent said guide, there being a plurality of cam-prongs projecting from each washer toward the other, a one-way clutch between said thimble and the washer adjacent thereto, and a helical spring interposed between the washers and surrounding the prongs, the ends of the spring being non-rotatably secured to the respective washers and the direction of coiling the spring being such as to oppose the wedging effect of said prongs.

In testimony whereof, I do affix my signature in presence of two witnesses.

MARCUS O. ANTHONY.

Witnesses:
ALBERT G. ERICKSON,
JOHN A. BOMMHARDT.